United States Patent Office 3,316,139
Patented Apr. 25, 1967

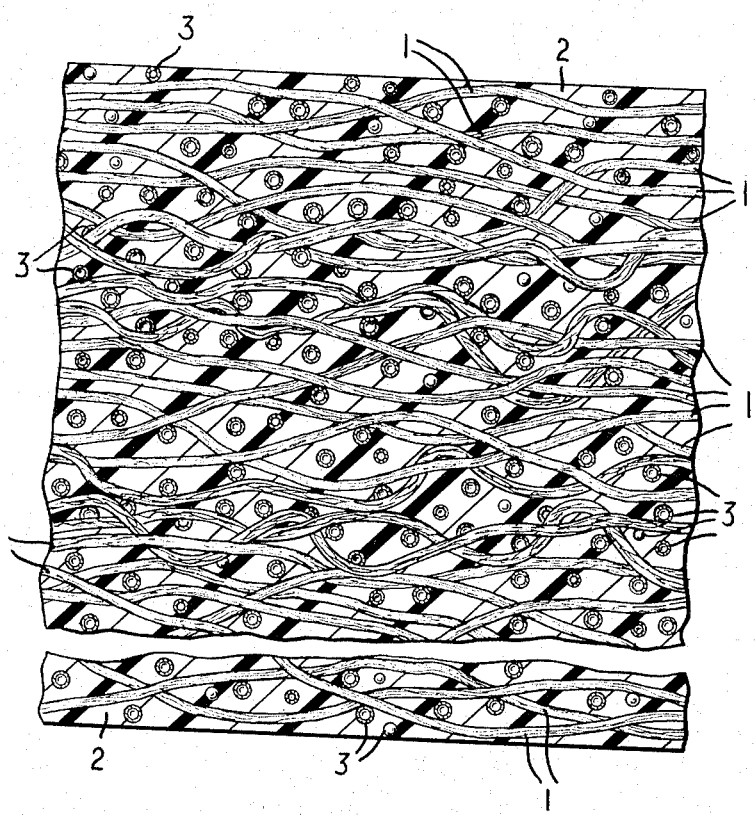

3,316,139
PLASTIC STRUCTURE CONTAINING FIBROUS LAYERS AND HOLLOW GLASS SPHERES
Harvey E. Alford, Amherst, and Franklin Veatch, Lyndhurst, Ohio, assignors to The Standard Oil Company, Cleveland, Ohio, a corporation of Ohio
Filed Dec. 31, 1964, Ser. No. 422,704
7 Claims. (Cl. 161—72)

This application is a continuation-in-part of copending application Ser. No. 181,197, filed Mar. 20, 1962, now abandoned, which is a continuation-in-part of application No. 862,436, filed Dec. 2, 1959, now U.S. Patent No. 3,030,215, dated Apr. 17, 1962, which is a division of Ser. No. 691,726, filed Oct. 22, 1957, now U.S. Patent No. 2,978,340, dated Apr. 4, 1961.

This invention relates to improved plastic laminating compositions especially adapted for use where high strength-to-weight ratios are required in the final laminated plastic and to the shaped, cured laminated plastic articles produced therefrom. More particularly, this invention relates to plastic laminating compositions containing, as a filler, a mass of hollow discrete spheres of synthetic, fused water-insoluble alkali metal silicate-based glass.

Laminated plastics are becoming increasingly important for many commercial applications. They are used now in the fabrication of sports car bodies, in the manufacture of luggage, in airplane parts and for many other purposes. They are highly desirable since they are characterized by high impact and compressive strengths and low weight.

Laminated plastics are shaped coherent articles formed of a plurality of superimposed layers of a woven or nonwoven porous reinforcing material bonded by a cured laminating resin. They are generally formed by the bonding, through the application of heat and pressure, of two or more superimposed layers of a resin-impregnated or resin coated porous reinforcing material. The reinforcing material can be either woven or nonwoven and is generally formed from a fibrous or filamentary material such as paper, cotton, glass, wool, asbestos, rayon and nylon. As a result of the application of heat and pressure, the alternating layers are shaped into the desired configuration and the laminating resin is cured, thereby converting the composite material into an insoluble, solid, optically homogeneous mass, which is irreversibly shaped as desired in the form of sheets, rods, tubes and various and sundry other molded forms.

Laminated plastics can be classified as high pressure laminates and low pressure laminates, expressing the distinction in terms of the molding pressure. A high pressure is defined as a pressure in excess of 1,000 pounds per square inch. Any laminate molded at lower pressures would be termed a low pressure laminate. This invention is applicable to both categories of laminates, and is particularly useful in the production of low pressure laminates employing a layer of fibrous glass as the porous material.

This invention makes use of the discovery that stronger laminated plastic products can be produced when the laminating resin contains, as a filler, a mass of the hollow glass spheres described and claimed in application Ser. No. 691,726, now U.S. Patent No. 2,978,340. This increase in strength is particularly advantageous in that it is accompanied by a substantial decrease in the density of the product. Therefore, this invention yields laminated plastic products having higher strength-to-weight ratios than have heretofore been obtainable, using conventional reinforcing materials.

The hollow glass spheres useful in this invention are of the type described in copending application Ser. No. 862,436 filed Dec. 2, 1959, now U.S. Patent No. 3,030,215, and can be characterized as being hollow discrete spheres of synthetic, fused, water-insoluble alkali metal silicate-based glass. These spheres have solid walls of approximately uniform density and clear, smooth surfaces. They may be varied in size depending upon the size of the feed particles, the amount of gas-liberating agent, the temperature, etc. In general, the spheres will have a diameter within the range of 5 to 5,000 microns and preferably 10 to 750 microns. Within the preferred range the average sphere diameter will usually be from about 75 to 200 microns. A typical mass of spheres for example, has particles within the size range of 10 to 350 microns with an average diameter of 100 microns.

The gas density of a mass of the spheres will vary to some extent with the density of the material from which they are formed, but to a larger extent with the ratio of the volume of the spheres to their wall thicknesses. Gas densities in the range of 0.1 to 0.75 gram per cubic centimeter have been achieved in accordance with the invention described in the parent application. For most purposes, lower densities are desirable and densities in the range of 0.25 to 0.45 gram per cubic centimeter are preferred. In the very low densities, the spheres tend to be more fragile because of the thinness of the walls. Within the preferred range, the spheres have adequate strength for most uses.

The wall thickness is very small. For instance, a sphere having a diameter of 350 microns and a gas density of 0.3 gram per cubic centimeter has a wall thickness of only 4 microns, which is only a little more than 1% of the diameter. In general, the wall thickness can be expressed as a percentage of the diameter of the spheres and will be about 0.5 to 10% thereof, preferably about 0.75 to 1.5% of the diameter in particles having a diameter of 10 to 500 microns.

As disclosed in the parent application, the hollow spheres used in the composition of this invention can be made from an alkali metal silicate which has the formula $(Me_2O)_x \cdot (SiO_2)_y$. Various alkali metal silicates within the range where $x$ is 1, $y$ is 0.5 to 5 and Me is an alkali metal such as sodium, potassium, or lithium, have been found satisfactory. One alkali or a mixture of several alkali metals can make up the alkali metal portion. Sodium silicate is the preferred material since it is a low cost raw material readily available from various commercial sources in sufficient purity and uniformity from batch to batch. A typical example of a commercial sodium silicate which can be used in the process has the formula $Na_2O \cdot (SiO_2)_{3.22}$. The alkali metal silicate will be referred to hereinafter as the basic feed material in the process. It is convenient to use it initially as an aqueous solution or slurry having a silicate content of 35 to 50 percent. The amount of water present is not critical since it is subsequently removed.

A silicate insolubilizing agent must be added to the basic feed material. Such insolubilizing agents render the hollow spheres more resistant to moisture. This agent can be selected from among the oxides of metals and metalloids, such as the oxides of zinc, aluminum, calcium, iron, boron, magnesium, or lead. Such oxide or oxides may be added directly to the feed material, or compounds which will readily decompose under heat to yield the desired oxide may be incorporated with the feed material. The latter method can be accomplished by the addition of such metal salts as carbonates or bicarbonates, i.e., calcium carbonate or bicarbonate, nitrates, halides, sulfates or hydroxides, such as aluminum hydroxide. The metal component can also be in the negative radical, such as in borates, such as borax, and aluminates, such as potassium aluminate. In such case, the alkali metal in the silicate may be correspondingly reduced. The use of such oxides or oxide-forming compounds is well known in the glass and ceramics industry, and any standard text in this field explains their function and the properties they impart in forming a water-insoluble glass-like composition upon fusion of the same with an alkali metal silicate. The amount of silicate insolubilizing agent may vary, depending on its composition and the degree of water desensitization required. The above texts explain this. Generally, the amount used will be from about 0.5 to 10% based on a 40% solution of sodium silicate. Boric acid and boric oxide are the preferred silicate insolubilizing agents in that they also appear to have the effect of lowering the required fusion temperature.

The composition containing the silicate and the insolubilizing agent should be so selected as to ingredients and proportions as to give a molten glass mixture having a high viscosity at a fairly low fusion temperature and a high surface tension. The word "glass" as used herein with reference to composition is intended to refer to the fusion product of an alkali metal silicate with an oxide, said product having an amorphous form, being insoluble in water and otherwise having the known properties of glass, although not necessarily being transparent. The silicate and the oxide are referred to herein as glass-forming ingredients.

In order to achieve spheres of very low density, it is necessary to add to the composition a compound or compounds which will liberate a gas at about the fusion temperature of the glass-forming composition. If the gas is liberated at too low a temperature, it is likely to be dissipated or become otherwise unavailable at the time when the particles fuse with the result that the particles will remain solid. On the other hand, if the gas is not liberated at or prior to the fusion temperature, the particles will also remain solid. The amount of gas liberating agent employed need not be large, generally from 0.1 to 5% by weight based upon the weight of the glass-forming solution can be used. An amount of 0.5 to 2% is usually preferred, depending upon the amount of gas capable of being liberated. Unduly large amounts of gas are to be avoided since they cause the expanding particles to burst with resultant collapse and fusion in the solid state. There are a large number of liquid and solid substances which can be used as gas liberating agents.

Typical of these substances are salts selected from the group consisting of carbonates, nitrates, nitrites, azides, carbamates, oxalates, formates, benzoates, sulfates, sulfites, and bicarbonates such as sodium bicarbonate, sodium carbonate, ammonium carbonate, sodium nitrate, sodium nitrite, ammonium chloride, ammonium carbamate, ammonium bicarbonate, sodium sulfite, calcium oxalate, magnesium oxalate, sodium formate, ammonium benzoate, ammonium nitrite, zinc sulfate, zinc carbonate, aluminum sulfate, and aluminum nitrate. Typical of organic compounds are urea, dimethylol urea, biuret, melamine, trinitrotoluene, mellitic acid, glycerin, aniline p-sulfonic acid, trimethyl glycine, adipic acid, aminoquinoline, nitroaminobenzoic acid, nitrobenzonitrile, 5-methylresorcinol, pentaglycerol, pyridine dicarboxylic acid, thiophene carboxylic acid, tetrabromoaniline, trihydroxyanthraquinone, and Carbowax 1000.

The three components of the feed composition can be intimately mixed by any known procedure and subdivided into small particles. For example, the three components can be suspended or dissolved in a suitable liquid, and thereafter thoroughly mixed, and after removal of the liquid, as by evaporation, ground and if necessary, classified. The feed particle diameter can range in size from about 5 to about 2500 microns, although for economic reasons particles of a diameter not exceeding 500 microns ordinarily would be used. The economic limits of feed particle size depend largely upon the flexibility or range of operating conditions of the furnace used in the process. For any one particular batch it will be highly advantageous to use a feed of as narrow a particle size range that can economically be obtained. Otherwise, widely varying sizes of particles will require such highly different heat requirements for conversion to hollow spheres that it will be much more difficult to find optimum operating conditions for the furnace. By use of a narrow range of feed particle sizes, a more uniform product can be obtained in higher yields. The specific particle size range to be used also will be determined in part by the ultimate properties desired.

It is preferred to introduce the particulate mixture comprising the basic feed material, the gas liberating agent, and the silicate-insolubilizing agent as a dry or substantially dry material which need not be completely anhydrous, in a heated zone where the particles can be suspended in a hot gas stream and there be caused to fuse and expand. Many types of equipment can be used in this stage including the furnace disclosed in Patent No. 2,978,339 which is based upon an application filed of even date with the application upon which Patent No. 2,978,340 issued. This furnace utilizes an updraft principle where the feed particles are introduced at or near the bottom of the furnace in an ascending column of hot gases. In such a furnace the particle settling rate in the gas is a balance of the buoyancy exerted on the particle by the upward velocity of the gas against the particle mass and volume or density. In this manner the particle receives heat in direct relationship to the requirements of heat necessary to fuse and expand it to a hollow sphere. This furnace permits the economical use of a feed of somewhat wider particle size range than might otherwise be the case.

The main process variable for a furnace of this type are temperature and particle residence time. The temperature is selected in accordance with the fusion temperature of the feed mixture. This temperature must be sufficiently high to melt the solid particles but be maintained as low as possible to minimize costs and to facilitate process control. Temperatures within the range of 1000° to 2500° F. can be used, depending on the feed employed and residence time.

The particle residence time in the furnace becomes primarily a function of feed particle size and the total flow of gases through the furnace. Accordingly, the residence time for any given size apparatus may be adjusted to an optimum for the particular feed mixture and particle size range by varying the total flow of gases through the furnace. The operating conditions are adjusted so that the feed particles remain suspended in the hot region of the furnace for a time adequate to fuse and expand the particles to hollow spheres and are then carried upward in the ascending column of hot gases out of the high temperature zone of the furnace into levels of progressively lower temperatures so that the outer skin has time to substantially solidify without danger of rupture during product collection. The particles move out with the stream of gases into the cooler regions of the furnace to be collected either at the bottom of a chamber which surrounds the high temperature zone of the furnace, or the particles may remain in the ascending gases and pass overhead from the cooling zone in a separating zone where the particles are separated from the gases and collected. Residence times of 0.5 to 10 seconds are generally employed.

As indicated, the material entering the furnace is usually relatively dry. Generally it should not contain more than 20% by weight of moisture. Preferably it should contain about 3% or less of moisture by weight. The higher the water content, the greater the heat requirements in the fusing step. In addition, a lower moisture content will usually result in more satisfactory hollow spheres. The material can be dried by conventional methods, as for example, by heating in an air oven at a temperature well below its fusion temperature prior to introduction to the furnace.

EXAMPLE A

This example represents the method of producing the hollow spheres which are thereafter to be used in the composition of this invention. The feed composition was made by forming a slurry of a sodium silicate solution containing 40% sodium silicate $Na_2O \cdot (SiO_2)_{3.22}$ to which had been added 5.6% boric acid and 1% urea, based on the weight of the sodium silicate solution. The slurry was stirred until uniform and spread out in pans one inch thick and dried in an oven at a temperature of 580° F. for sixteen hours. The dried material which had a moisture content of 3% was ground and classified by screening. All particles having a diameter of less than 250 microns were retained as feed material. These particles had an average diameter of 60 microns.

The feed material was fed into a vertical tubular furnace having an updraft flow of the type described above at a rate of 2 pounds per hour in a furnace having a diameter of 10 inches and a height of 32 inches. The temperature within the furnace was 2000° F. and the average residence time of the particles was two seconds.

The particles were collected after their exit from the top of the furnace and were found to vary in size from 10 to 350 microns with an average diameter of 100 microns and a gas density of 0.30 gram/ml. The walls of the particles were clear and transparent and free from bubbles. All of the particles were hollow and uniform in appearance and varied only as to size within the above range.

The laminating resins employed in conjunction with these hollow glass spheres are any of those resins conventionally employed in the manufacture of laminated plastics, such as the polyester resins, the polyepoxide resins, the phenol-aldehyde resins, the silicone resins, the melamine-aldehyde resins, the polystyrene resins, the polycarbonate resins and the polyvinyl resins. Other resins are occasionally used as well and are equally applicable for use in this invention.

Preferably, the laminating resin is a synthetic resin which is capable of being cured, and thereby converted into an infusible, insoluble resin which can serve as the matrix for the laminate during the laminating operation. For example, the laminating resin can be a synthetic resin capable of being cross-linked or further polymerized to this condition. Such a resin can be molded to the desired shape during the laminating operation, and then cured to retain this shape irreversibly.

The particular laminating resin to be employed for a given application is largely determined by the characteristics desired in the final product. For example, where excellent electrical insulation and resistance to chemicals, water and high temperatures are required, and where color is not overly important, the phenol-aldehyde resins are employed. Phenol-aldehyde resin laminates are extensively used in the manufacture of component parts of rocket and missile assemblies.

The melamine-aldehyde resins typically exhibit excellent abrasion resistance, good electrical insulation and good chemical resistance. Because of these properties, plus their ability to accept and retain colors, melamine resin laminates are used extensively in many consumer items such as table tops, kitchen appliances and wall paneling.

Where the prime requisites of the laminate are a high degree of temperature resistance and superior electrical properties, the silicone resins are often employed. These are resistant to the application of temperatures as high as 500° F. for extended periods of time.

For easy coloring and good all-around properties under normal conditions, polyester resin laminates are employed.

The phenol-aldehyde resins employed in the production of plastic laminates are well known. These resins are conventionally made by the condensation of phenols or substituted phenols with aldehydes such as formaldehyde, acetaldehyde and furfural. The preferred phenol compounds are those which have at least three active hydrogen atoms. The condensation takes place in the presence of a catalyst such as sodium carbonate or ammonia and in the presence of excess aldehyde. The condensation goes through three stages, conventionally known as the A, B and C stages. The A stage resin is thermoplastic and alcohol-soluble. The B stage resin softens and is moldable upon the application of heat and pressure, but it does not completely melt. The C stage resin is infusible, and completely insoluble, due to further polymerization. In the production of laminates, it is generally the B stage resin that is employed, and the molding operation is used to convert the B stage to the C stage. Where an acid catalyst is employed for the condensation reaction and there is excess phenol in the reaction medium, the condensation proceeds more rapidly, and yields a thermoplastic product which can thereafter be rendered infusible either by the addition of more aldehyde and an alkaline catalyst or by the addition of an amine cross-linking agent. As is well known, the properties of the final phenol-aldehyde resin and thus of the laminate depend to a very great extent upon the nature of the starting materials employed. The phenol-aldehyde resins can be modified by the addition of various plasticizers and other monomers or polymers.

The melamine-aldehyde resins are conventionally prepared by the condensation of melamine with an aliphatic aldehyde such as formaldehyde. The condensation reaction proceeds in two stages. In the first stage, a fusible, solvent-soluble methylol compound such as hexamethylol melamine is formed. It is this first stage product that is conventionally used for the production of plastic laminates. The first stage resin is then further condensed during the molding operation to an infusible, insoluble product by the appliaction of heat, and the use of a suitable catalyst in the mixture such as, for example, an aliphatic alcohol. Various acids are also known to accelerate the curing of the melamine resins.

In like manner, the urea-aldehyde resins are produced in a two stage process by the reaction of urea or substituted ureas with aliphatic aldehydes.

The epoxy resins or polyepoxides are well known as the condensation products of compounds containing oxirane rings

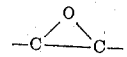

with aliphatic or aromatic compounds containing hydroxyl groups, or compounds containing active hydrogen atoms such as amines, acids or acid aldehydes. The properties of the resins vary greatly with the starting materials, and can be modified through the use of any of a number of techniques well known to the art. The resins formed by the condensation reaction are thermosetting, and can be cross-linked by the application of heat. Various cross-linking agents and catalysts are also conventionally employed. The cross-linking agents normally employed with epoxy resins for use in laminating compositions are selected in accordance with the speed of cure desired. For example, diethylene triamine yields a very rapid cure at room temperature. Diethyleneaminopropylamine yields cures at moderate temperatures, and m-phenylenediamine is operative as a curing catalyst only at elevated temperatures. The most commonly employed epoxy resins are prepared in accordance with conventional procedure by reacting epichlorohydrin with Bis-phenol A or its homologs.

The polyester resins are produced by the esterification of polybasic organic acids with polyhydric alcohols. The polyesters most commonly employed in the production of plastic laminates are of the unsaturated type in which either or both of the polybasic acid and the polyhydric alcohol contain nonaromatic unsaturation.

Conventionally, the unsaturation is introduced by the use of unsaturated aliphatic dibasic acids, such as, for example, maleic or fumaric acids. The esterification step is conducted under conditions that will substantially prevent any tendency toward polymerization across the double bonds. This may be done by controlling the temperature of the esterification and the use of inhibitors of addition polymerization. In order to prevent the inclusion of oxygen, the reaction is generally carried out in an inert atmosphere. Where it is desirable to reduce the amount of unsaturation present in the polyester, the unsaturated acid can be mixed with a quantity of a polybasic acid or acid anhydride. The alcohol component of the polyester will generally be a saturated glycol but can also be an unsaturated polyhydric alcohol.

After the esterification reaction takes place, the unsaturated polyester composition to be cross-linked is mixed with a monomeric copolymerizable compound. The temperature of the reaction and the character of both the polyester and the cross-linking agent as well as the quantity of cross-linking agent employed determine the speed of the cross-linking reaction. Representative cross-linking agents include such compounds as styrene, methyl methacrylate, diallyl phthalate and many others well known to the art. Additional peroxide catalysts and the like, as well as room temperature stabilizers, can also be employed.

The silicone resins are organic polymers composed of linear chains of alternating silicon and oxygen atoms, the chains being linked together by cross-links between those or through various organic groups attached to the silicon. These are also known as organosiloxane polymers, and are generally produced by the hydrolysis and condensation of organosilicon alcohol and halide intermediates.

Among the fluorocarbon polymers, such polymers as polytetrafluoroethylene are occasionally employed for special effects in plastic laminates. The polyvinyl resins and the polyacrylic resins are occasionally employed in the production, but are not too frequently used since they are not readily cross-linked.

The hollow glass spheres are used in accordance with the invention as a filler with the laminating resin, and are consequently present in admixture with and homogeneously distributed in the resin in the laminated structures of the invention, and thus are also distributed in the resin impregnating the reinforcing layer employed in the laminate.

Many different types of reinforcing materials are used as the reinforcing layer in the production of laminated plastics. The type employed in a particular application will depend upon the final properties desired and the characteristics of the resin to be used. Papers such as kraft paper, alpha paper and rag paper are used where low cost is of prime importance, and where the major requirement of the final product is good electrical insulation.

Cotton fabrics are used where mechanical properties rather than electrical properties are desired. These cotton fabrics can vary in weight from about 2 to about 10 ounces per square yard. Where it is desired that the final product have a particularly smooth surface, fine weave cotton fabrics weighing less than about 4 ounces per square yard with a minimum of about 72 threads per inch of any ply in the weft direction and 140 threads per inch in both the weft and warp directions can be used.

Laminated plastics highly resistant to heat are made with asbestos as the reinforcing fiber. The asbestos fibers can be in the form of nonwoven felts or mats. The asbestos felts are approximately 10 mil thick while the mats have a greater thickness. Both the felts and mats are composed of mechanically opened asbestos fibers that have been carded to arrange them in a web form. Asbestos paper is made from dispersed, single long fibers. Exceptionally heat-resistant laminated plastic articles are obtained when asbestos reinforcing materials are used in conjunction with phenolic resins.

Fibrous glass reinforcing materials are used very frequently in the production of plastic laminates. They are known to yield laminated plastic articles having low moisture absorption, high tensile, flexual and compressive strengths, increased heat resistance and excellent electrical properties. Where the fibrous glass is in the form of woven glass fabrics, they are conventionally measured in terms of thickness, which, in turn, depends upon the yarn size. Nonwoven glass mats are also used. These are made of randomly deposited continuous fiber. They also may be made of chopped strands, conventionally ½ to 2 inches in length laid down on a screen by means of suction and then sprayed with a binder which holds the fibers in place. Alternatively, glass mats can be produced by stitching the chopped fibers so that they become interlaced. Glass mats are characterized in terms of their weight in ounces per square foot.

For use in laminated plastics, glass fiber surfaces are generally pre-treated so that they can be bonded to the resins. This treatment consists either of heating for a period of time, generally seven to nine hours, at about 650° F. or the surface of the glass fibers can be modified by the use of known chemical treatments.

Fabrics made from nylon yarn yield laminated plastics having high impact strength, good electrical insulation, abrasion resistance, toughness and resistance to chemical attack. So-called "plastic plywood," in which thin layers of wood are treated so as to become substantially saturated with a synthetic resin and then adhered, can be produced by means of this invention, the thin layers of wood being the porous reinforcing material. Reinforcing materials made of other fibers can be used for particular purposes, including regenerated cellulose fibers such as rayon, polyester fibers, polyacrylonitrile fibers and cellulose ester and ether fibers.

The degree of porosity of the reinforcing material is not critical. The only requirement, as is known to the art, is that the material be penetrable to some extent by the laminating resin and filler hollow glass spheres incorporated therein. This requirement is satisfied by any woven fabric, any mesh material, any fabric composed of a plurality of fibers or filaments and by other coherent materials that are sufficiently porous to permit penetration of the laminating resin and hollow glass spheres filler incorporated therein.

In the production of laminated plastics in accordance with this invention, the hollow glass spheres are mixed with the particular laminating resin to be employed by conventional mixing methods. If the laminating resin is in the liquid state, or dissolved in a suitable solvent, the hollow glass spheres can be combined therewith in a conventional shear-type mixer. If the laminating resin is in the solid state, the hollow glass spheres can be added on a rubber mill, care being taken not to exceed the curing temperature of the resin. Where the resin is a powder, a simple physical intermixing is sufficient.

Generally, from about 1 to 300 parts by weight of hollow glass spheres are employed per 100 parts by weight of resin. Excellent high strength laminates are obtained when from about 5 to about 75 parts by weight of hollow spheres are employed. Very light weight and comparatively strong products are obtained with from about 100 to about 300 parts by weight of hollow spheres.

Conventional means are used to form the laminates. For example, a layer of resin and hollow glass spheres can be pressed in a suitable mold, a layer of reinforcing fabric superimposed thereon, another layer of laminating resin and hollow glass spheres applied, and so on until the requisite thickness of product has been obtained. Thereafter, heat and pressure can be applied to the mold to cause the resin to fuse and solidify, thereby bonding together the alternating layers and producing a composite laminated plastic article. Alternatively, where the resin is initially a liquid, the reinforcing fabric can be coated with the liquid resin and hollow glass spheres, and thereafter another sheet of coated glass fabric superimposed thereon, and so on.

The type of structure thus obtained is shown in FIGURE 1. Each layer of the reinforcing fabric fibers 1, in this case a nonwoven fabric, is impregnated with the laminating resin 2 and hollow glass spheres 3, and the layers are thus bonded together by a continuous matrix of laminating resin and hollow glass spheres filler.

A type of laminated plastic product which is becoming increasingly important in aircraft and missle applications is the so-called "sandwich panel." These panels are generally comprised of two layers of glass adhered one to the other by a suitable core material. Where the synthetic resin compositions of this invention containing hollow glass spheres filler are used as the core material, extremely strong and durable sandwich panels are obtained.

The structure thus obtained is similar to that shown in FIGURE 1 except that in this case the core material between the layers, although composed of laminating resin and hollow glass spheres filler, is not necessarily the same combination of laminating resin and hollow glass spheres impregnating the fabric layers, since the layers of glass fabric can be impregnated with the laminating resin-hollow glass spheres separately, and then bonded together by the laminating resin-hollow glass spheres filler core material. If the same laminating resin-hollow glass spheres composition is used for both purposes, the structure is practically identical to that shown in FIGURE 1, using a woven glass fabric in place of the nonwoven fabric.

After sufficient heat and pressure has been applied to the laminate compositions to permit shaping and irreversible setting, for example, by cross linking, the product is generally allowed to cool slowly. Rapid cooling is generally to be avoided, since it often results in the embrittlement of the surface layers and/or the warpage or buckling of the laminated plastic product.

It will be understood that for many applications, the combination of one or more laminating resins with one or more porous reinforcing materials is desirable. In addition, for special effects, it will sometimes be desirable to use small quantities of other fillers for the resin in addition to the hollow glass spheres. The amount of porous reinforcing material employed in preparing the laminated plastics of this invention varies in accordance with the strength and purpose of the product and the type of fiber. The final product will generally contain from about 2 to about 50 percent by weight of porous reinforcing material.

Further details on conventional methods employed in the manufacture and use of laminated plastics man be had by reference to the book "Laminated Plastics" by D. J. Duffin et al. (Reinhold, 1958) the contents of which are herein incorporated by reference.

The following examples represent, in the opinion of the inventors, the preferred mode of carrying out their invention:

EXAMPLE 1

A polyester laminating resin composition was prepared by reacting an equimolar mixture of maleic acid and phthalic anhydride with propylene glycol to an acid number of 6–10. Thirty percent by weight of styrene was added to the linear polyester thus formed to provide the desired degree of cure in the final product.

The object of this example was to obtain two products, one containing hollow glass spheres as a filler, and the other containing calcium carbonate as a filler, having approximately the same strength, in order to illustrate the advantages of this invention. Accordingly, to this prepared composition, two parts per 100 parts by weight of resin of a cross-linking catalyst consisting of equal weights of benzoyl peroxide and tricresyl phosphate were added, and the composition then divided into two portions. To one portion, hollow glass spheres produced in accordance with Example A above were added in a shear-type mixer. To the second portion of the composition, finely-divided calcium carbonate, a conventional filler, was added. The proportions of each filler were adjusted so as to achieve approximately uniform properties in the final laminated plastic articles.

Laminated plastic products were then made from each of the two filled polyester resin compositions. In preparing the polyester resin laminates, a mold having a cross-section of 6 inches by 6 inches was used. One layer of a fibrous glass mat weighing 1 ounce per square foot was placed in the mold and was painted with the filled resin composition. A second layer of glass mat reinforcement which had been previously painted with the resin composition was then added to the mold, followed by a third layer, and so on, until the requisite thickness of the product was obtained. The mold was then closed and the resin cured at a temperature of 220° F. for about ten minutes under a pressure of about 50 pounds per square inch. The structure of laminate thus obtained was that shown in FIGURE 1 with the layers of glass mat reinforcing material bonded together by a continuous matrix of calcium carbonate or hollow glass sphere-filled cured polyester resin composition.

The results tabulated in Table I clearly show that by means of this invention products considerably lighter in weight but of the same strength as conventionally filled products can be obtained. Whereas the glass-sphere filled laminated plastic articles contained only 2.1% by weight of filler, a laminated plastic article of the same strength, filled with a conventional filler contained 25.2% by weight of filler. As a result, for products of the same strength, the sample containing the hollow glass spheres had a density about 20% less than that of the conventional laminated product. It can be seen from the data that by means of this invention, not only is the amount of bulk filler required reduced but the amount of reinforcing filler necessary to achieve a product of a given strength is also substantially reduced.

TABLE I

| | Hollow Glass Sphere Filler | Calcium Carbonate Filler |
|---|---|---|
| Weight percent filler in laminate | 2.1 | 25.2 |
| Weight percent reinforcing fiber | 15 | 40 |
| Density of laminate, g./cc. | 1.44 | 1.82 |
| Tensile strength, p.s.i. | 14,400 | 15,000 |
| Flexural strength, p.s.i. | 26,900 | 25,000 |
| Modulus in flexure, p.s.i. | $1.74 \times 10^6$ | $1.3 \times 10^6$ |
| Wet strength retention, flexure, p.s.i. | 19,700 | 17,500 |
| Water absorption, weight percent | 0.6 | 0.5 |

EXAMPLE 2

A commercial phenolic molding powder which was the reaction product of 100 parts by weight of formaldehyde with 155 parts by weight of phenol (catalyzed by a trace of sulfuric acid) to which had beeen added 5% of hexamethylene tetramine (as an activator) and 1% of calcium stearate (as a lubricant) was prepared and divided into two portions. Approximately equal amounts of China clay, a conventional filler, were added to one portion and hollow glass spheres to the other portion by mixing in the dry state until optically homogeneous mixtures were obtained. Phenolic laminates were then prepared from each mixture by placing a layer of a fibrous glass mat weighing 1 ounce per square foot in a 6 inch by 6 inch mold, then pouring the mixture of phenolic powder and filler over this. Two additional glass mat reinforcing layers were applied in a similar manner, and the mold thereafter closed. The products were molded under a pressure of about 50 pounds per square inch at a temperature of 100 to 110° C. for fifteen minutes. The samples were then post-cured at a temperature of 250° F. for two hours and thereafter allowed to cool slowly to room temperature. The structure of laminate thus obtained was that shown in FIGURE 1 with the layers of glass mat reinforcing material bonded together by a continuous matrix of China clay or hollow glass sphere-filled cured phenol formaldehyde resin composition. The properties obtained from the two samples are noted in Table II.

The results indicate that for approximately equal proportions by volume of filler, much stronger products are noted in Table II.

The results indicate that for approximately equal proportions by volume of filler, much stronger products are obtained by means of this invention. The hollow glass sphere-filled laminated plastic article showed an impact strength almost twice that of the conventionally filled laminate. This strength is obtained together with a decrease in density so that the strength-to-weight ratios of products obtained by means of this invention are much higher than those conventionally obtained. The increase in strength-to-weight ratio in flexure by means of this invention was almost 100%. In addition, products obtained by means of this invention have a small tendency to absorb water.

TABLE II

|  | China Clay Filler | Hollow Glass Sphere Filler |
|---|---|---|
| Volume percent bulk filler in laminate | 19.95 | 20.10 |
| Volume percent glass mat in laminate | 18.80 | 18.98 |
| Volume percent resin in laminate | 61.25 | 60.92 |
| Density of laminate, gm./cc | 1.73 | 1.30 |
| Flexural strength, p.s.i | 15,500 | 21,300 |
| Flexural strength-to-weight ratio | 9,000 | 16,300 |
| Impact strength, ft-lb./in. of notch Izod | 11.0 | 18.74 |
| Weight percent water absorption | 1.12 | 0.89 |

EXAMPLES 3 TO 6

In accordance with the procedure of Example 1, additional plastic laminates were prepared containing varying amounts of hollow glass spheres as a filler material for the polyester resin component. The compositions employed and the properties obtained are indicated in Table III. The results therein are illustrative of the excellent physical properties obtained with the use of varying amounts of hollow glass spheres in accordance with this invention.

TABLE III

| Example | 3 | 4 | 5 | 6 |
|---|---|---|---|---|
| Weight percent resin | 84.75 | 83.0 | 81.32 | 78.12 |
| Weight percent hollow glass spheres in laminate | 0 | 2.08 | 4.06 | 7.81 |
| Weight percent glass reinforcing fibers in laminate | 15.25 | 14.92 | 14.62 | 14.07 |
| Volume percent resin in laminate | 91.86 | 85.54 | 80.00 | 70.86 |
| Volume percent hollow glass spheres | 0 | 6.90 | 12.91 | 22.87 |
| Volume percent glass reinforcing fibers | 8.14 | 7.56 | 7.09 | 6.27 |
| Density of laminate, gm./cc | 1.49 | 1.44 | 1.36 | 1.20 |
| Impact strength, ASTM D-256-54T, ft.-lb./inch notch | 32.72 | 27.79 | 21.92 | 17.99 |
| Flexural strength, dry p.s.i | 31,500 | 26,900 | 25,500 | 20,700 |
| Flexural strength after 2 hours immersion in boiling water | 17,400 | 19,700 | 15,600 | 15,200 |
| Modulus of elasticity, dry 10⁶, p.s.i | 1.78 | 1.74 | 1.23 | 1.01 |
| Modulus of elasticity after 2 hours immersion in boiling water, 10⁶ p.s.i | 0.99 | 0.92 | 0.73 | 0.66 |

EXAMPLES 7 TO 10

Four additional phenolic resin laminates were prepared in accordance with the procedure of Example 2 containing varying amounts of hollow glass spheres as a filler material for the resin. The weight percent of reinforcing glass fiber was kept constant in each case. The composition employed and results obtained are indicated in Table IV.

TABLE IV

| Example | 7 | 8 | 9 | 10 |
|---|---|---|---|---|
| Weight percent resin in laminate | 65.9 | 60.4 | 54.9 | 49.4 |
| Weight percent hollow glass spheres in laminate | 0 | 5.5 | 11.0 | 16.5 |
| Weight percent glass reinforcing fibers in laminate | 34.1 | 34.1 | 34.1 | 34.1 |
| Volume percent resin in laminate | 77.78 | 60.92 | 48.32 | 38.55 |
| Volume percent hollow glass spheres in laminate | 0 | 20.10 | 35.10 | 46.75 |
| Volume percent glass reinforcing fibers in laminate | 22.22 | 18.98 | 16.58 | 14.70 |
| Density of laminate, gm./cc | 1.50 | 1.30 | 1.12 | 1.07 |

EXAMPLES 11 TO 14

These examples illustrate the preparation of sandwich panels. The sandwich panels were prepared by placing a glass cloth panel surfacing material which had been treated with a conditioning agent consisting of a solution of methacrylato chromic acid in isopropanol in a mold measuring 6 inches by 6 inches. A layer of a polyester resin of the type employed in Example 1 containing 2% by weight of the benzoyl peroxide tricesyl phosphate and to which specified proportions of hollow glass spheres have been added as a filler material was added to the mold. A second layer of the glass fabric panel surfacing material was then placed in the mold on top of the polyester resin composition. The mold was closed and the product cured at a temperature of 200° F. for ten minutes. The resulting product had a structure similar to that shown in FIGURE 1, but with the hollow glass sphere-filled polyester resin confined to impregnation only of the surface of the glass cloth panel surfacing materials. The methacrylato chromic acid composition impregnated the interior of the glass cloth panel surfacing material, restricting impregnation of the laminating resin to the surface portions. The panels were, however, bonded together by the matrix of laminating resin filled with hollow glass spheres in accordance with the invention, extending between the partially impregnated glass core panel. The properties of the finished sandwich panel were tested and the results are indicated in Table V. Compression and flexural tests were made on the product both in the flat direction and in the edgewise direction. The results indicate that sandwich panels prepared in accordance with this invention have physical properties meeting the rigid requirements for such panels promulgated by various government agencies.

TABLE V

| Example | 11 | 12 | 13 | 14 |
|---|---|---|---|---|
| True Volume percent resin in core | 40 | 30 | 20 | 10 |
| True Volume percent hollow glass sphere in core | 60 | 70 | 80 | 90 |
| Density of sandwich panel, gm./cc | 0.80 | 0.74 | 0.71 | 0.57 |
| Tensile strength, p.s.i | 2,070 | 1,100 | 897 | 604 |
| Compressive strength, flat, p.s.i | 3,450 | 3,130 | 2,720 | 1,480 |
| Modulus of elasticity in compression, flat, p.s.i. ×10⁵ | 1.99 | 2.09 | 2.10 | 0.89 |
| Compressive strength, edgewise, p.s.i | 4,060 | 3,390 | 3,010 | 1,490 |
| Modulus of elasticity in compression, p.s.i. ×10⁵ | 2.57 | 2.52 | 2.78 | 1.26 |
| Flexural strength, flat, p.s.i | 6,820 | 5,840 | 3,870 | 3,730 |
| Modulus of elasticity in flexure, flat, p.s.i. ×10⁵ | 8.47 | 8.26 | 5.22 | 6.40 |
| Flexural strength, edgewise, p.s.i | 4,490 | 4,350 | 3,460 | 2,040 |
| Modulus of elasticity in flexure, edgewise, p.s.i. ×10⁵ | 4.49 | 4.23 | 4.09 | 2.54 |

EXAMPLES 15 TO 17

An epoxy resin composition was prepared by reacting 5 moles of epichlorohydrin with 4 moles of Bisphenol A in an alkaline solution until an epoxy resin of a molecular weight of about 1000 was achieved. This resin was then divided into three parts. A quantity of hollow glass spheres as noted in Table VI was added to each of the compositions and thereafter 10 parts by weight of diethylene triamine curing agent per 100 parts of resin were added to each of the three compositions. Laminated plastic sheets were then made from each of the filled epoxy resin compositions using the procedure of Example 1 and employing the same type of mold and the same type of fibrous glass mat as in Examples 11–14. The laminates were molded at a pressure of 50 p.s.i.g. for ten minutes at room temperature and then post-cured for two hours at 250° F. The resulting products had a structure like that of FIGURE 1, with the resin and hollow glass spheres filler forming a continuous matrix for the glass mat. Thereafter, the compressive strength of the laminated products were measured. The results, tabulated in Table VI, show that high strength, low density products can be produced from epoxy resins by means of this invention.

TABLE VI

| Example | 15 | 16 | 17 |
|---|---|---|---|
| Volume percent resin in laminate | 11 | 21.5 | 31.9 |
| Volume percent hollow glass spheres | 87.5 | 77.0 | 66.6 |
| Volume percent glass reinforcing fibers | 1.5 | 1.5 | 1.5 |
| Weight percent resin in laminate | 24.6 | 42.1 | 55.1 |
| Weight percent hollow glass spheres | 68.2 | 51.8 | 39.5 |
| Weight percent glass reinforcing fibers | 7.2 | 6.1 | 5.4 |
| Density of laminate, gm./cc. | 0.512 | 0.557 | 0.686 |
| Compressive strength, p.s.i. | 727 | 1,330 | 4,000 |
| Modulus of elasticity in compression p.s.i. ×$10^4$ | 5.39 | 9.88 | 26.0 |

We claim:

1. A shaped, filled, plastic structure characterized by a high flexural strength, tensile strength and modulus in flexure, consisting essentially of
   (a) at least two contiguous layers of a porous reinforcing material selected from the group consisting of paper, woven textile fibers, carded nonwoven fiber mats and felts, nonwoven chopped fiber mats and felts random only in two dimensions, nonwoven continuous fiber mats, and stitched nonwoven chopped fiber mats, the said layers being in an amount within the range from about 2 to about 50% by weight of the structure;
   (b) a plurality of hollow discrete spheres of synthetic fused water-insoluble alkali metal silicate-based glass, which spheres have clear, smooth surfaces, diameters of from 5 to 5000 microns, a wall thickness of from 0.5 to 10% of their diameters, and a gas density of 0.1 to 0.75 g./cc.; and
   (c) a continuous matrix of a synthetic organic resin bonding the porous reinforcing layers and the plurality of hollow glass spheres together, said hollow glass spheres being present in an amount within the range from about 1 to about 300% by weight of the resin.

2. A shaped, filled plastic structure in accordance with claim 1, wherein the porous reinforcing material comprises glass fibers.

3. A shaped, filled plastic structure in accordance with claim 1, wherein the synthetic organic resin comprises a polyester resin.

4. A shaped, filled plastic structure in accordance with claim 1, wherein the synthetic organic resin comprises a phenol-aldehyde resin.

5. A shaped, filled plastic structure in accordance with claim 1, wherein the synthetic organic resin comprises a melamine-aldehyde resin.

6. A shaped, filled plastic structure in accordance with claim 1, wherein the synthetic organic resin comprises a silicone polymer.

7. A shaped, filled plastic structure in accordance with claim 1, wherein the synthetic organic resin comprises an epoxy resin.

References Cited by the Examiner

UNITED STATES PATENTS

| 2,475,781 | 7/1949 | Gallup | 161—160 X |
| 2,806,509 | 9/1957 | Bozzacco et al. | 156—279 X |
| 3,030,215 | 4/1962 | Veatch et al. | 161—159 X |
| 3,079,289 | 2/1963 | George et al. | 252—63.5 |

OTHER REFERENCES

Sonneborn et al., Fiberglas Reinforced Plastics, Reinhold Pub. Corp., N.Y. (1954) TA 455 P55 S6, pp. 18038 relied on.

Sonneborn et al., Fiberglas Reinforced Plastics, Reinhold Pub. Corp., N.Y. (1954), pp. 65–67 relied on, TA455 P55 S6.

ALEXANDER WYMAN, *Primary Examiner.*

G. D. MORRIS, *Assistant Examiner.*